(12) United States Patent
Yokoi et al.

(10) Patent No.: US 11,519,886 B2
(45) Date of Patent: Dec. 6, 2022

(54) AUTOSAMPLER AND LIQUID CHROMATOGRAPH

(71) Applicant: SHIMADZU CORPORATION, Kyoto (JP)

(72) Inventors: Yusuke Yokoi, Kyoto (JP); Takaaki Fujita, Kyoto (JP); Takashi Inoue, Kyoto (JP); Kenichi Yasunaga, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 197 days.

(21) Appl. No.: 17/047,022

(22) PCT Filed: Jan. 16, 2019

(86) PCT No.: PCT/JP2019/001014
§ 371 (c)(1),
(2) Date: Oct. 12, 2020

(87) PCT Pub. No.: WO2019/211930
PCT Pub. Date: Nov. 7, 2019

(65) Prior Publication Data
US 2021/0148869 A1    May 20, 2021

(30) Foreign Application Priority Data

May 1, 2018    (JP) .............................. JP2018-088061

(51) Int. Cl.
*G01N 30/24*   (2006.01)
*G01N 30/32*   (2006.01)
*G01N 30/02*   (2006.01)

(52) U.S. Cl.
CPC ............. *G01N 30/24* (2013.01); *G01N 30/32* (2013.01); *G01N 2030/027* (2013.01); *G01N 2030/326* (2013.01)

(58) Field of Classification Search
CPC .. G01N 30/24; G01N 30/32; G01N 2030/027; G01N 2030/326; G01N 30/20
(Continued)

(56) References Cited

U.S. PATENT DOCUMENTS

| 2006/0207941 A1 | 9/2006 | Morikawa |
| 2016/0274069 A1 | 9/2016 | Fujita |
| 2020/0240960 A1* | 7/2020 | Song ...................... G01N 30/24 |

FOREIGN PATENT DOCUMENTS

| JP | 2006-258732 A | 9/2006 |
| JP | 2016-173256 A | 9/2016 |
| WO | 2017070156 | * 4/2017 |

OTHER PUBLICATIONS

International Search Report for corresponding Application No. PCT/JP2019/001014, dated Apr. 2, 2019.
(Continued)

*Primary Examiner* — Robert R Raevis
(74) *Attorney, Agent, or Firm* — Renner, Otto, Boisselle & Sklar, LLP

(57) ABSTRACT

An autosampler is switched selectively between an injecting mode where a sampling flow path is incorporated into an analysis flow path of a liquid chromatograph and a loading mode where the sampling flow path is not incorporated into the analysis flow path and injects a sample into the analysis flow path at a position farther upstream than a separation column by being switched to the injecting mode with the sample held in the sampling flow path, and includes a clog determiner configured to acquire a sending liquid pressure of a liquid sending pump that sends a mobile phase in the analysis flow path, obtain a variation value of the liquid sending pressure when the injecting mode and the loading mode are switched and determine presence or absence of a
(Continued)

clog in a system incorporated into the analysis flow path in the injecting mode based on the obtained variation value.

6 Claims, 2 Drawing Sheets

(58) Field of Classification Search
USPC ...... 73/61.55, 23.41, 23.42, 23.35, 37, 37.5,
73/61.52, 863.72, 863.73, 864.21;
422/81, 82, 70, 89; 210/656
See application file for complete search history.

(56) References Cited

OTHER PUBLICATIONS

Written Opinion for corresponding Application No. PCT/JP2019/001014, dated Apr. 2, 2019.

* cited by examiner

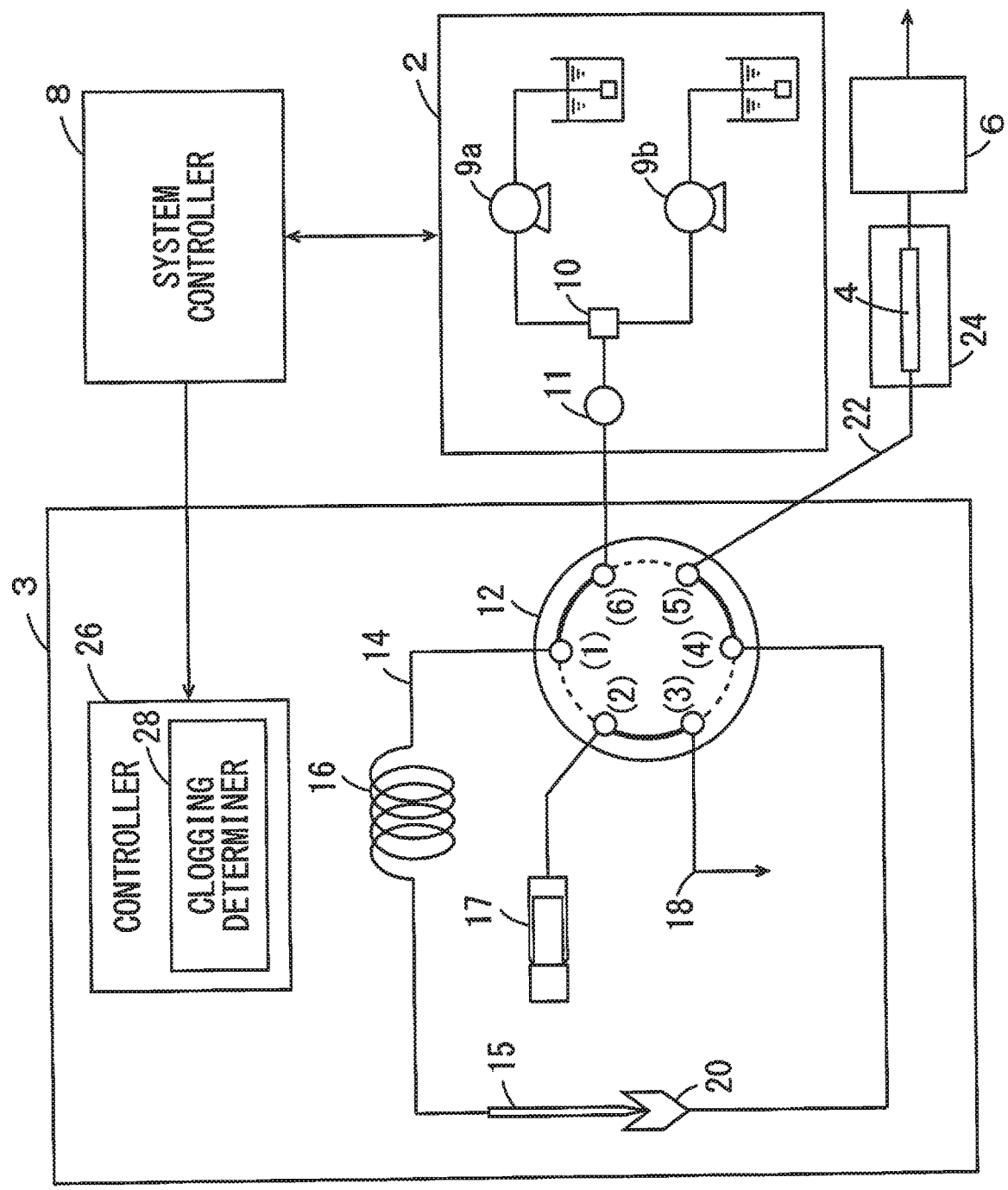
F I G. 1

AUTOSAMPLER AND LIQUID CHROMATOGRAPH

TECHNICAL FIELD

The present invention relates to an autosampler that automatically injects a sample into an analysis flow path of a liquid chromatograph and the liquid chromatograph including the autosampler.

BACKGROUND ART

A total volume injection type autosampler has been known as a device that injects a sample into an analysis flow path for liquid chromatography. The total volume injection type autosampler includes a needle at a tip and a sampling flow path for temporarily holding a sample that has been sucked through the needle and is configured to switch between a state where the sampling flow path is incorporated into an analysis flow path (an injecting mode) and a state where the sampling flow path is not incorporated into the analysis flow path (loading mode) (See Patent Document 1).

CITATION LIST

Patent Document

[Patent Document 1] JP 2016-173256 A

SUMMARY OF INVENTION

Technical Problem

In a liquid chromatograph, a flow path may become clogged due to precipitation of salt or the like in an analysis system. The system pressure increases when the analysis system is clogged. Therefore, a clog in the analysis system can be detected if the system pressure is monitored. However, even in a case where a clog in the analysis system can be detected, the location of the clog cannot be specified.

The needle of the autosampler is likely to be clogged in the analysis system. If a clog in the needle of the autosampler can be easily specified when the analysis system is clogged, the problem can be resolved only by cleaning or exchanging of the needle.

As such, an object of the present invention is to facilitate specification of the location of a clog in an analysis system of a liquid chromatograph.

Solution to Problem

An autosampler according to the present invention has a sampling flow path for temporarily holding a sample, is switched selectively between an injecting mode where the sampling flow path is incorporated into an analysis flow path of a liquid chromatograph and a loading mode where the sampling flow path is not incorporated into the analysis flow path and injects the sample into the analysis flow path at a position farther upstream than a separation column by being switched to the injecting mode with the sample held in the sampling flow path, and includes a clog determiner configured to acquire a sending liquid pressure of a liquid sending pump that sends a mobile phase in the analysis flow path, obtain a variation value of the liquid sending pressure when the injecting mode and the loading mode are switched and determine presence or absence of a clog in a system incorporated into the analysis flow path in the injecting mode based on the obtained variation value.

Although a variation in liquid sending pressure is generated due to compression or expansion of the mobile phase when the mode of the autosampler is switched, the degree of variability increases in accordance with the magnitude of the liquid sending pressure. Therefore, in a case where an absolute value of the variation value of the liquid sending pressure is used for determination of presence or absence of a clog, determination may be erroneously made when the magnitude of the liquid sending pressure is large.

As such, in the autosampler of the present invention, the clog determiner is preferably configured to determine presence or absence of a clog in the system incorporated into the analysis flow path in the injecting mode by comparing a value obtained by division of a variation value of the liquid sending pressure when the injecting mode and the loading mode are switched by the liquid sending pressure, that is, a ratio of a variation to the liquid sending pressure with a preset threshold value. This can prevent erroneous determination of the pressure variation that is generated when the mode of the autosampler is switched as a clog in the flow path.

In the above-mentioned case, the threshold value can be set to a value larger than a ratio of a pressure variation that is generated when the loading mode is switched to the injecting mode to a liquid sending pressure.

A liquid chromatograph according to the present invention includes an analysis flow path, the above-mentioned autosampler that injects a sample into the analysis flow path, a separation column for separating the sample that has been injected into the analysis flow path into components by the autosampler and a detector that is provided at a position farther downstream than the separation column on the analysis flow path and is to detect a sample component into which the sample is separated in the separation column.

Advantageous Effects of Invention

An autosampler according to the present invention includes a clog determiner configured to import a liquid sending pressure of a liquid sending pump that sends a mobile phase in an analysis flow path, obtain a variation value of the liquid sending pressure when an injecting mode and a loading mode are switched and determine presence or absence of a clog in a system incorporated into the analysis flow path in the injecting mode based on the obtained variation value, whereby presence or absence of a clog in the system incorporated into the analysis flow path in the injecting mode can be easily identified. This facilitates specification of the location of a clog in the analysis system of the liquid chromatograph.

The liquid chromatograph according to the present invention includes the above-mentioned autosampler, thereby facilitating specification of the location of a clog in the analysis system.

BRIEF DESCRIPTION OF THE DRAWINGS

FIG. 1 A schematic diagram showing the configuration of one inventive example of a liquid chromatograph.

DESCRIPTION OF EMBODIMENTS

Figure 2:
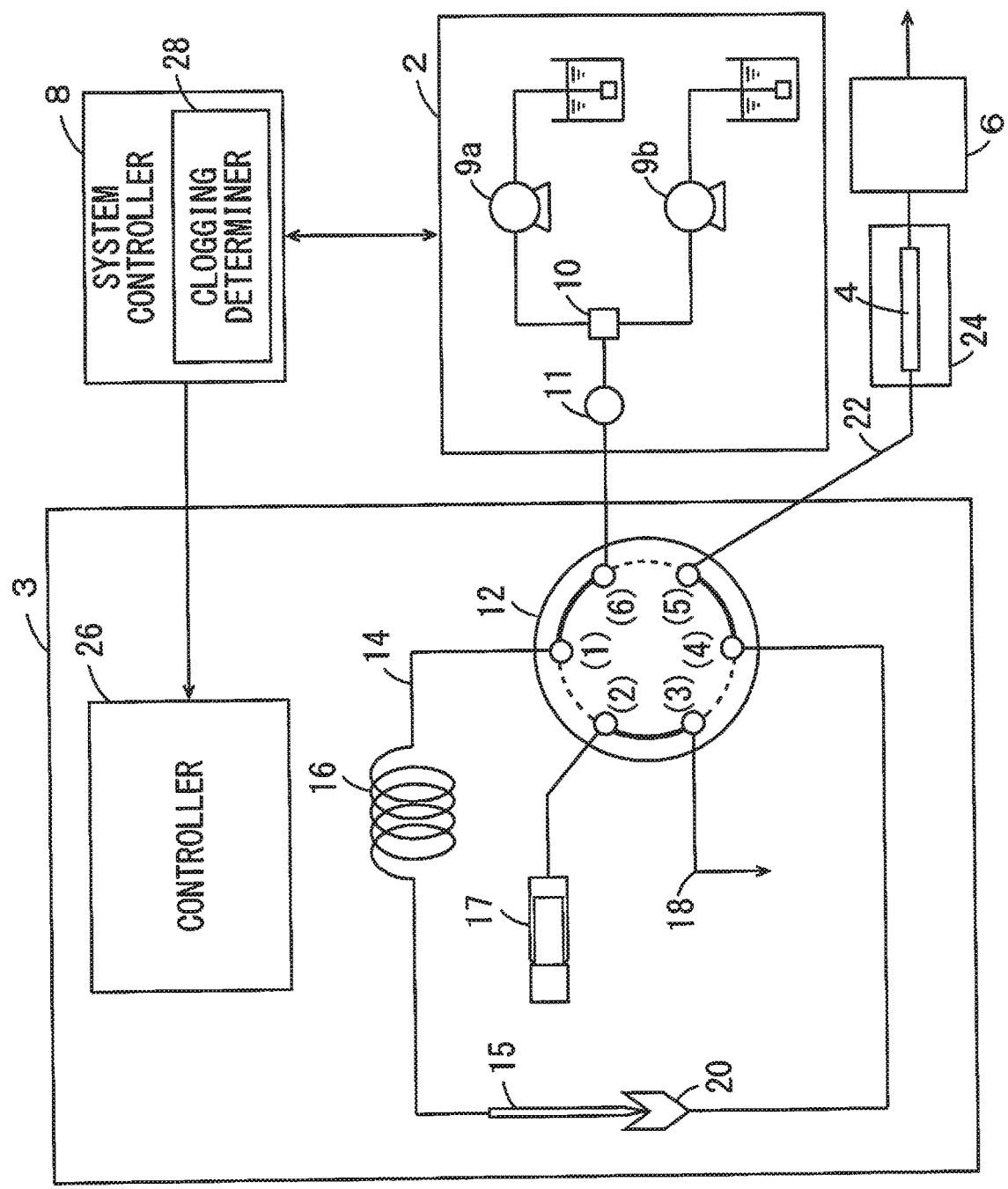
FIG. 2 A schematic diagram showing the configuration of another inventive example of a liquid chromatograph.

One inventive example of an autosampler and a liquid chromatograph including the autosampler will be described with reference to FIG. 1.

The liquid chromatograph of this inventive example includes a liquid sending device 2, the autosampler 3, a separation column 4, a detector 6 and a system controller 8. The liquid sending device 2, the autosampler 3, the separation column 4 and the detector 6 are connected by pipes to one another in series in this order from an upstream position and constitute an analysis flow path for liquid chromatography. The separation column 4 is stored in a column oven 24, and the temperature of the separation column 4 is adjusted to a certain temperature. The system controller 8 is to manage the entire system of this liquid chromatograph.

The liquid sending device 2 has two liquid sending pumps 9a, 9b, sends different solvents from the respective liquid sending pumps 9a, 9b to a mixer 10 for mixing and sends a liquid mixture in the analysis flow path as a mobile phase. A pressure sensor 11 for detecting a liquid sending pressure is provided in the liquid sending device 2.

The autosampler 3 has a switch valve 12 for switching the configuration of a flow path of the analysis flow path. In this inventive example, the switch valve 12 is a multi-port valve having six ports (1) to (6) and is configured to switch the connections between adjacent ports. The base of a sampling flow path 14 is connected to the port (1) of the switch valve 12, and a syringe pump 17 is connected to the port (2). A drain flow path 18 that leads to a drain is connected to the port (3), and an injection port 20 is connected to the port (4). A flow path 22 having the separation column 4 and the detector 6 is connected to the port (5), and a flow path from the liquid sending device 2 is connected to the port (6). The switch valve 12 can switch to either one of a first state (shown in the diagram) where the ports (1) and (6) communicate with each other, the ports (2) and (3) communicate with each other and the ports (4) and (5) communicate with each other, and a second state where the ports (1) and (2) communicate with each other, the ports (3) and (4) communicate with each other and the ports (5) and (6) communicate with each other.

A needle 15 is provided at the tip of the sampling flow path 14, and a sample loop 16 is provided at the base of the needle 15. The sampling flow path 14 is a flow path for temporarily holding the sample that has been sucked from the tip of the needle 15 in the sample loop 16. The needle 15 is moved by a movement mechanism (not shown).

As shown in the diagram, in a case where the switch valve 12 is put in the first state with the tip of the needle 15 inserted into the injection port 20, the liquid sending device 2, the sampling flow path 14 and the separation column 4 are connected in series, that is, the sampling flow path 14 is incorporated into the analysis flow path. This state is referred to as an injecting mode.

On the other hand, when the switch valve 12 switches to the second state, the ports (5) and (6) communicate with each other. Thus, the liquid sending device 2 and the separation column 4 are connected to each other without the sampling flow path 14, that is, the sampling flow path 14 is not incorporated into the analysis flow path. This state is referred to as a loading mode.

In the loading mode, the ports (1) and (2) of the switch valve 12 communicate with each other, and the base of the sampling flow path 14 is connected to the syringe pump 17. Therefore, the sample can be sucked by the syringe pump 17 through the tip of the needle 15 from a sample container (not shown). The sample that has been sucked from the tip of the needle 15 stays in the sample loop 16. In a case where the autosampler 3 is switched to the injecting mode in this state, the sampling flow path 14 is incorporated into the analysis flow path, and the sample held in the sample loop 16 is transported to the separation column 4 by the mobile phase from the liquid sending device 2. Generally, the autosampler 3 is switched to the loading mode when the sample is introduced into the separation column 4. The sample that has been introduced into the separation column 4 is separated into components, and the sample components eluted from the separation column 4 are detected sequentially by the detector 6.

The autosampler 3 includes a controller 26 for controlling the operations of the switch valve 12, the movement mechanism (not shown) for moving the needle 15 and the syringe pump 17. The controller 26 is realized by a computer circuit such as a microcomputer mounted with an arithmetic element and a memory element. The controller 26 includes a clog determiner 28. The clog determiner 28 is a function obtained by execution of a program by the arithmetic element.

A liquid sending pressure detected by the pressure sensor 11 of the liquid sending device 2 is imported to the controller 26 of the autosampler 3 via the system controller 8. The clog determiner 28 is configured to obtain a variation value of a liquid sending pressure when the autosampler 3 is switched between the injecting mode and the loading mode and determine presence or absence of a clog in the system incorporated into the analysis flow path in the injecting mode, that is, presence or absence of a clog in the sampling flow path 14 or the injection port, based on the variation value.

In a case where the sampling flow path 14 or the injection port 20 is clogged, when the autosampler 3 is switched from the loading mode to the injecting mode, the liquid sending pressure of the liquid sending device 2 increases. As such, the clog determiner 28 obtains the difference (P2−P1) between the liquid sending pressure (P1) before the autosampler 3 is switched from the loading mode to the injecting mode and the liquid sending pressure (P2) after the autosampler 3 is switched from the loading mode to the injecting mode as a variation value ΔP, and compares a value obtained by division of the variation value ΔP by the liquid sending pressure (P1) with a preset threshold value. Further, in a case where the value obtained by division of the variation value ΔP by the liquid sending pressure (P1) exceeds the threshold value, the clog determiner 28 determines that the sampling flow path 14 or the injection port 20 is clogged. The threshold value is set to a value larger than the ratio of a pressure variation that is generated when the autosampler 3 is switched from the loading mode to the injecting mode to the liquid sending pressure and is held by the controller 26 or the system controller 8.

The clog determiner 28 may be configured to issue some sort of warning when determining that the incorporated system is clogged in the injecting mode. As a warning method, generation of a warning sound is also mentioned in addition to the display that informs an occurrence of a clog on a display unit provided in the autosampler 3 or the system controller 8 or on a display unit of a computer connected to the system controller 8, for example.

The clog determiner 28 does not necessarily have to be provided in the controller 26 of the autosampler 3. As shown in FIG. 2, the clog determiner 28 can be provided as a function of the system controller 8. Further, the computer connected to the system controller 8 can be provided with a function as the clog determiner 28. In such a case, the system controller or the computer provided with the clog determiner 28 partially constitutes the autosampler 3.

As described above, the autosampler 3 makes determination about a clog in the system based on a variation value of the liquid sending pressure when the autosampler 3 is switched between the loading mode and the injecting mode, whereby an occurrence of a clog at a specific location including the sampling flow path 14 or the injection port 20 can be detected. This facilitates specification of the location of a clog in the analysis system.

REFERENCE SIGNS LIST

2 Liquid sending device
3 Autosampler
4 Separation column
6 Detector
8 System controller
9a, 9b Liquid sending pumps
10 Mixer
11 Pressure sensor
12 Switch valve
14 Sampling flow path
15 Needle
16 Sample loop
17 Syringe pump
18 Drain flow path
20 Injection port
22 Flow path
24 Column oven
26 Controller
28 Clog determiner

The invention claimed is:

1. An autosampler for use with a liquid chromatograph including an analysis flow path and a separation column, the autosampler having a sampling flow path for temporarily holding a sample and being selectively switchable between an injecting mode where the sampling flow path is incorporated into the analysis flow path of the liquid chromatograph and a loading mode where the sampling flow path is not incorporated into the analysis flow path, and injects the sample into the analysis flow path at a position farther upstream than the separation column by being switched to the injecting mode with the sample held in the sampling flow path, the autosampler further comprising:

a clog determiner configured to acquire a sending liquid pressure of a liquid sending pump that sends a mobile phase in the analysis flow path, obtain a difference between the liquid sending pressure acquired at a time before the autosampler is switched between the injecting mode and the loading mode, and the liquid sending pressure acquired at a time after the autosampler is switched between the injecting mode and the loading mode, as a variation value of the liquid sending pressure, and determine presence or absence of a clog in a system incorporated into the analysis flow path in the injecting mode based on the obtained variation value.

2. The autosampler according to claim 1, wherein
the clog determiner is configured to determine presence or absence of a clog in the system incorporated into the analysis flow path in the injecting mode by comparing a value obtained by division of the variation value by the liquid sending pressure, with a preset threshold value.

3. The autosampler according to claim 2, wherein
the threshold value is set to a value larger than a ratio of a pressure variation that is generated when the loading mode is switched to the injecting mode to a liquid sending pressure.

4. A liquid chromatograph, comprising:
the analysis flow path, the liquid sending pump, the separation column and the autosampler as recited in claim 1;
and
a detector that is provided at a position farther downstream than the separation column on the analysis flow path and is to detect a sample component into which the sample is separated in the separation column.

5. The liquid chromatograph according to claim 4, wherein
the clog determiner of the autosampler is configured to determine presence or absence of a clog in a system incorporated into the analysis flow path in an injecting mode by comparing a value obtained by division of the variation value by the liquid sending pressure, with a preset threshold value.

6. The liquid chromatograph according to claim 5, wherein
the threshold value is set to a value larger than a ratio of a pressure variation that is generated when the loading mode is switched to the injecting mode to a liquid sending pressure.

* * * * *